June 1, 1926.  
A. N. KENDAL  
1,587,382  
STAND OR SUPPORT FOR MOTOR CYCLES AND OTHER CYCLES  
Filed Nov. 6, 1924 2 Sheets-Sheet 1
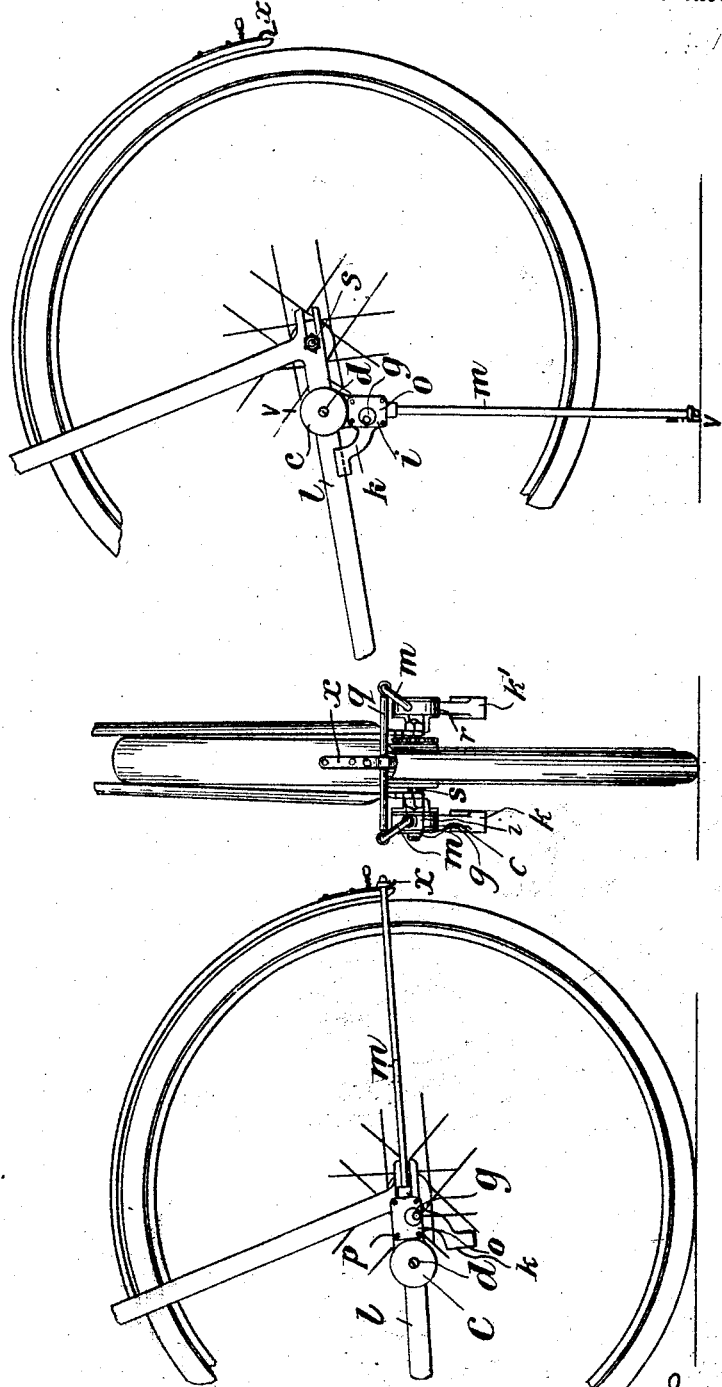

June 1, 1926.
A. N. KENDAL
1,587,382
STAND OR SUPPORT FOR MOTOR CYCLES AND OTHER CYCLES
Filed Nov. 6, 1924    2 Sheets-Sheet 2
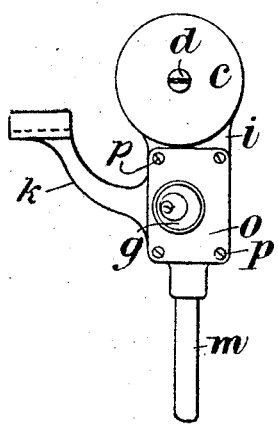
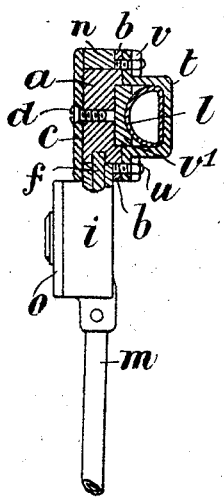
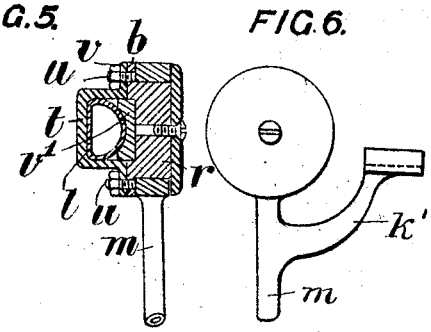
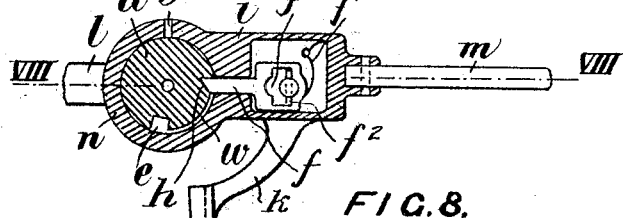
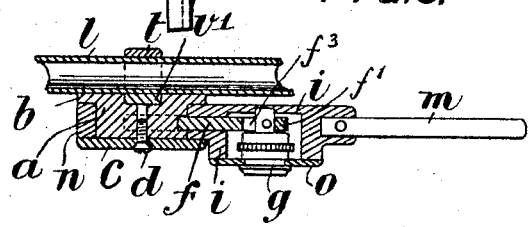
Inventor
Adrian Noel Kendal
By Henry Orth
atty.

Patented June 1, 1926.

1,587,382

UNITED STATES PATENT OFFICE.

ADRIAN NOEL KENDAL, OF TIDWORTH, ENGLAND.

STAND OR SUPPORT FOR MOTOR CYCLES AND OTHER CYCLES.

Application filed November 6, 1924, Serial No. 748,135, and in Great Britain December 27, 1923.

This invention relates to improvements in stands or supports for motor cycles and other cycles and more particularly to that kind of support which is pivotally or revolubly attached to the rear or front wheel axle or to the frame of the machine, the said supports being adapted to be swung round on to the ground to support the wheel off the ground and to be locked in that position and also to be secured in position clear of the ground when not required.

According to this invention, a disc or discs is or are fixed on the rear or front wheel axle or elsewhere on the frame, the stand or support is pivotally mounted on the said disc or discs and a locking device is adapted to lock the support to one or each of the discs when the stand is lowered to raise the wheel off the ground. The stand or support or each of its members is conveniently furnished with a circular strap or ring revoluble on or in a groove in the disc and one or each of the said straps has an enlargement or casing to contain the lock, the bolt of which is adapted to pass through a hole or slot in the ring and into a housing or recess in the disc to lock the stand in the lowered position in which the rear wheel is raised off the ground. The locking device may also be similarly adapted to hold the stand in the position clear of the ground when it is not required.

And in order that the invention may be readily understood and carried into effect, reference will be made to the accompanying drawings, in which:—

Figure 1 is a side elevation of a part of a bicycle provided with this invention and showing the stand or support in the position when not in use.

Figure 2 is an end elevation thereof.

Figure 3 is a side elevation showing the stand or support in use and supporting the rear or driving wheel of the bicycle out of contact with the ground.

Figure 4 is a side elevation to an enlarged scale of the inner end and lock of one side of the support in the position shown in Figure 3.

Figure 5 is a part sectional elevation on the line V—V Figure 3 but to an enlarged scale.

Figure 6 is a side elevation similar to Figure 4 of part of the stand but of the other side of the stand or support.

Figure 7 is a sectional elevation of that portion of the stand or support shown in Figure 4, and in the position shown in Figure 1, and Figure 8 is a section thereof, taken approximately on the line VIII—VIII Figure 7.

In carrying the invention into effect and as applied for raising or supporting the driving or rear wheel of an existing bicycle, the construction illustrated by the drawings comprises a centrally recessed disc $a$ Figures 5, 7 and 8, having an integral flange $b$ on one side and a disc $c$ Figures 4, 5 and 8, on the other side to form a second flange secured by a screw $d$ in the central recess or hole so that, in effect, the disc has a central groove in its periphery and a radial slot or recess $e$ (Figure 7) therein. This recess $e$ is adapted to form a housing for a bolt $f$ of a lock $g$ of any suitable construction. If desired, there may be two of these recesses at a suitable distance apart, that is to say, in addition to the recess $e$ there is also another recess $h$. Moreover, if desired, and as shown only in Figure 3, there is on one side of the disc and fixed to or integral with a casing $i$ of the stand containing the lock $g$, a projecting stud or lug $k$ adapted to serve as a stop to come against a chain-stay $l$ or back fork or other frame member in order to limit the angular movement of one of the two stand members $m$ in relation to the disc $a$ and thereby obviate undue pressure on the bolt when the stand is in use. Obviously, the other member $m$ of the stand is also provided, if desired, with a similar lug $k'$, Figs. 2 and 6. The pivot or fulcrum-end of one member $m$ (Figures 5, 7 and 8) of the stand is furnished with a ring or strap $n$, which is undivided and integral with the lock-casing $i$, and has such an internal diameter as to enable it to fit and rotate in the groove of the disc $a$. The casing $i$ is formed as, for instance by being recessed as shown to receive the lock $g$ which is conveniently fixed in the slot or recess in the casing by attaching it to a plate $o$ which is secured by screws $p$. The ring $n$ and the lock-casing $i$ are furnished with a radial slot through which the bolt $f$ is adapted to protrude. The stand as shown in Fig. 2 and comprising two supports $m$ connected near their outer ends by a tubular rail or cross-bar $q$, is mounted on the disc $a$ on one side and on a somewhat similar disc $r$ (Figure 5)

on the other side. The said discs $a$ and $r$ are fixed on the chain stays $l$ by means of straps $t$, studs $u$ and nuts $v$. Packing strips $v'$ (Fig. 5) prevent the chain stays $l$ from being crushed when nuts $v$ of the studs are screwed up tightly. The bolt $f$ Figs. 7 and 8 is adapted to be normally pressed into the recesses $h$ by a spring $f'$. When the bolt $f$ has been retracted from the recess $h$ and the support has been rotated a sufficient distance, said bolt will protrude into the housing or slot $e$ in the disc $a$ and then the support will be in the position to raise the wheel of the machine from the ground. To release the stand from the position shown in Figure 3, the lock is unlocked by means of a key inserted in the keyhole $g'$ (Fig. 4) and this key is adapted in any well known manner to cause a tumbler $f^2$ to be partially rotated in the slot $f^3$ in the bolt $f$ (Figs. 7 and 8) so that the latter passes out of the recess $e$, whereupon the stand may be partially rotated from the position shown in Figs. 1, 7 and 8. The disc $a$ furnished with a groove such as marked $w$ in Figure 7, and the bolt is bevelled on one side so as to allow the bolt to be pressed out of the recess or housing $h$, when the stand or support is lowered and to be automatically locked when the bolt slides into the recess $e$ and, therefore, it only requires a key for unlocking. In the raised condition of the stand, the bolt $f$ is conveniently housed in the recess $h$ and the cross bar or tubular rail $q$ is attached to any convenient part, as the mudguard by a spring clip $x$, shown in Figures 1, 2 and 3 although the bolt $f$ engages in the recess $h$ the clip $x$ serves to support practically the entire weight of the stand when in the raised position and out of use.

Each of the rings $n$ is provided with an oil-hole $y$ such as is shown in Figure 7 for the purpose of lubrication.

I claim:—

1. A cycle stand, comprising a disc, means for fixing the disc on a cycle, a support pivotally mounted on the said disc, and a locking device adapted to lock the stand on the disc when the stand is lowered and a wheel of the cycle is raised clear of the ground.

2. A cycle stand comprising a disc, means for fixing the disc on a cycle, a support pivotally mounted on said disc, a locking device, means coacting with the locking device adapted to lock the support on the disc when the stand is lowered and a wheel of the cycle is raised clear of the ground, and means co-acting with the locking device adapted to hold the support when clear of the ground on the disc.

3. A cycle stand comprising a disc having a recess therein, means for fixing the disc on a cycle, a support pivotally mounted on said disc, a locking device mounted on the support, and a bolt operated by the locking device and adapted to engage in the recess in the disc when the support is lowered and a wheel of the cycle is raised clear of the ground.

4. A cycle stand comprising a disc having two radial recesses therein at approximately 90 degrees to each other, means for fixing the disc on a cycle, a support, pivotally mounted on said disc, a locking device mounted on the support, a bolt operated by the locking device and adapted to engage in either of the said recesses according as the support is lowered and a wheel of the cycle is raised clear of the ground or the support is raised and out of use.

5. A cycle stand comprising a disc, means for fixing the disc on a cycle in the plane of the wheel to be raised from the ground, a support pivotally mounted on said disc, and a locking device adapted to lock the support on the disc when the support is lowered and the wheel is raised clear of the ground.

6. A cycle stand comprising a disc, means for fixing the disc on a cycle in the plane of the wheel to be raised from the ground, a support pivotally mounted on the said disc, a locking device, means co-acting with the locking device adapted to lock the support on the disc when the support is lowered and the wheel is raised clear of the ground, and means co-acting with the locking device adapted to hold the support on the disc when raised clear of the ground.

7. A cycle stand comprising a disc having a recess therein, means for fixing the disc on a cycle in the plane of the wheel to be raised from the ground, a support pivotally mounted on the said disc, a locking device mounted on the support, a bolt operated by the locking device and adapted to engage in the recess in the disc when the support is lowered and the wheel of the cycle is raised clear of the ground.

8. A cycle stand comprising a disc, having two radial recesses therein at approximately 90 degrees to each other, means for fixing the disc on a cycle in the plane of the wheel to be raised from the ground, a support pivotally mounted on said disc, a locking device mounted on the support, a bolt operated by the locking device and adapted to engage in either of the said recesses according as the support is lowered and a wheel of the cycle is raised clear of the ground or the support is raised and out of use.

9. A cycle stand comprising a disc having two radial recesses therein at approximately 90 degrees to each other, means for fixing said disc on one side of a cycle frame member, a second disc, means for fixing the latter on the opposite side of the cycle frame, a support comprising two longitudinal members connected together by a cross-bar each longitudinal support member being pivotally mounted on one of said discs, a locking device mounted on the support, a bolt operated by the locking device and adapted to engage either of the said recesses according as the support is lowered and a wheel of the cycle is raised clear of the ground or the support is raised and out of use.

10. A cycle stand comprising a disc having two radial recesses therein at approximately 90 degrees to each other, means for fixing said disc on one side of a cycle frame member, a second disc and means for fixing the latter on a frame member at the other side of the cycle, a support comprising two longitudinal members connected together by a cross-bar, a lock-casing on one longitudinal member, a lock in said casing comprising a bolt, a ring on the free end of said casing pivotally mounted on the disc, means for preventing axial displacement of the ring, said ring having a passage through which the bolt of the lock is adapted to pass and engage one or other of the said housings according as the support is lowered and a wheel of the cycle is raised clear of the ground or the support is raised and out of use, a ring on one end of the other longitudinal support member pivotally mounted on the other disc, and means for preventing axial displacement of the latter ring.

11. A cycle stand comprising a disc having two radial recesses therein at approximately 90 degrees to each other, a second disc, means for fixing both discs to the chain stays of the cycle, a support comprising two longitudinal members connected together by a cross-bar, a ring on each longitudinal member at one end rotatably mounted on a disc, means for preventing axial displacement of the rings, a lock casing mounted on one longitudinal member and integral with its ring, a lock in said casing, a bolt operated by the lock, a passage in the casing through which the bolt of the lock is adapted to pass and engage one or other of the said recesses according as the support is lowered and one end of the cycle is raised with a wheel clear of the ground or the support is raised and out of use, and means on a fixed part of the cycle for engaging the support in the latter position.

12. A cycle stand comprising a disc having two recesses therein at approximately 90 degrees to each other, one recess being formed on one side deeper than on the other side and the other recess having a radial wall nearest to the shallow side of the first recess, said recess forming housings for a bolt, a perforated strap, studs on the said strap and nuts for fixing said disc to a chain stay of the cycle, a support comprising two longitudinal members connected together by a cross-bar, a ring on each longitudinal member near one end rotatably mounted on a disc, flanges on the discs for preventing the axial displacement of the rings, a lock casing mounted on one longitudinal support member and integral with its ring, a lug on each support adapted to engage the chain-stay of the cycle and serve as stops, a lock in said casing, a bolt bevelled at one end and adapted to be operated by the lock, a hole in the ring for the passage of the bolt adapted to engage in one or other of the said housings as the support is lowered and one end of the cycle is raised to enable a wheel to be clear of the ground or the support is raised and out of use, and a spring clip mounted on a fixed part of the cycle for engaging the support in the latter position.

ADRIAN NOEL KENDAL.